(12) United States Patent
Zhao et al.

(10) Patent No.: US 9,632,368 B2
(45) Date of Patent: Apr. 25, 2017

(54) LIQUID CRYSTAL DISPLAY PIXEL STRUCTURE AND MANUFACTURE METHOD THEREOF

(71) Applicant: Shenzhen China Star Optoelectronics Technology Co., Ltd., Shenzhen, Guangdong (CN)

(72) Inventors: Feng Zhao, Guangdong (CN); Chungyi Chiu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 279 days.

(21) Appl. No.: 14/423,426

(22) PCT Filed: Feb. 6, 2015

(86) PCT No.: PCT/CN2015/072366
§ 371 (c)(1),
(2) Date: Feb. 23, 2015

(87) PCT Pub. No.: WO2016/078229
PCT Pub. Date: May 26, 2016

(65) Prior Publication Data
US 2016/0342033 A1    Nov. 24, 2016

(30) Foreign Application Priority Data

Nov. 17, 2014   (CN) .......................... 2014 1 0654606

(51) Int. Cl.
*G02F 1/1343* (2006.01)
*G02F 1/1333* (2006.01)
(Continued)

(52) U.S. Cl.
CPC ...... *G02F 1/134309* (2013.01); *G02F 1/1337* (2013.01); *G02F 1/1368* (2013.01);
(Continued)

(58) Field of Classification Search
CPC ......... G02F 1/134309; G02F 2201/123; G02F 1/133345; G02F 1/133707; G02F 2201/40;
(Continued)

(56) References Cited

U.S. PATENT DOCUMENTS

2009/0147162 A1* 6/2009 Yeom ................ G02F 1/133707
349/33
2011/0317104 A1* 12/2011 Nakamura ........ G02F 1/133371
349/106

(Continued)

FOREIGN PATENT DOCUMENTS

CN          202306063 U     7/2012

*Primary Examiner* — Paul Lee
*Assistant Examiner* — Jia Pan
(74) *Attorney, Agent, or Firm* — Andrew C. Cheng (57) ABSTRACT

The present invention provides a liquid crystal display pixel structure and a manufacture method thereof. The liquid crystal display pixel structure comprises: a lower substrate, a passivation layer located on an upper surface of the lower substrate, a pixel electrode located on the passivation layer, an upper substrate, and a common electrode located on a lower surface of the upper substrate; each pixel comprises multi domains; in one pixel, the passivation layer comprises at least two trench structures having different depths, and the pixel electrode uninterruptedly covers on the trench structures, the trench structures having different depths divide the one pixel into different areas to realize that liquid crystals in different areas of the one pixel have different twisted angles under the same driving voltage. The liquid crystal display pixel structure of the present invention is capable of improving the color washout phenomenon under wide view angle, and simplifying the driving control circuit and raising the pixel aperture ratio.

12 Claims, 12 Drawing Sheets

(51) Int. Cl.
*G02F 1/1337* (2006.01)
*G02F 1/1368* (2006.01)
(52) U.S. Cl.
CPC ...... *G02F 1/13378* (2013.01); *G02F 1/13439* (2013.01); *G02F 1/133345* (2013.01); *G02F 2001/133397* (2013.01); *G02F 2001/133792* (2013.01); *G02F 2201/121* (2013.01); *G02F 2201/123* (2013.01); *G02F 2201/40* (2013.01)
(58) Field of Classification Search
CPC ..... G02F 2001/133397; G02F 1/13439; G02F 2001/133792
See application file for complete search history.

(56) References Cited

U.S. PATENT DOCUMENTS

| | | | | |
|---|---|---|---|---|
| 2013/0002625 A1* | 1/2013 | Liao | ................ | G02F 1/134309 345/205 |
| 2013/0242247 A1* | 9/2013 | Lee | ................ | G02F 1/13439 349/138 |
| 2013/0293822 A1* | 11/2013 | Chung | ............. | G02F 1/133707 349/144 |
| 2014/0253859 A1* | 9/2014 | Yoon | ................ | G02F 1/134336 349/144 |

\* cited by examiner

Fig. 8 area A

Fig. 9 area B

Fig. 14

LIQUID CRYSTAL DISPLAY PIXEL STRUCTURE AND MANUFACTURE METHOD THEREOF

FIELD OF THE INVENTION

The present invention relates to a display technology field, and more particularly to a liquid crystal display pixel structure and manufacture method thereof.

BACKGROUND OF THE INVENTION

The LCD (Liquid Crystal Display) possesses advantages of thin body, power saving and no radiation to be widely used in many application scope, such as LCD TV, mobile phone, personal digital assistant (PDA), digital camera, notebook, laptop, and dominates the flat panel display field.

Most of the liquid crystal displays on the present market are back light type liquid crystal displays, which comprise a shell, a liquid crystal display panel located in the shell and a backlight module located in the shell. The liquid crystal display panel is the major component of the liquid crystal display. However, the liquid crystal display panel itself does not emit light and needs the back light module to provide light source for normally showing images.

Generally, the liquid crystal display panel is formed by laminating two glass substrates and injecting liquid crystals between the two glass substrates. At the relative inner sides of the two glass substrates, the pixel electrode and the common electrode are respectively located, and the light of backlight module is reflected to generate images by applying driving voltages to control whether the liquid crystal molecules to be changed directions.

In the present LCDs, there will be color washout phenomenon under wide view angle. Although the present skill has utilized the pixel design of the multi domain display to improve the color washout under wide view angle, the color washout phenomenon remains to be obvious. Such situation becomes more obvious in the Vertical Alignment (VA) type LCDs. The present pixel design of improving the color washout under wide view angle requires to set the pixels as Main areas and Sub areas. Different Thin Film Transistors (TFT) are employed to respectively control the Main areas and Sub areas and respectively provide different driving voltages to make the liquid crystals in the Main areas and the Sub areas generate different rotation behaviors. Accordingly, the mixed compensation to the Gamma properties under wide view angle is implemented to realize the objective of improving the color washout. However, more TFTs mean more complicated control circuit and descend of the pixel aperture ratio.

Figure 1:
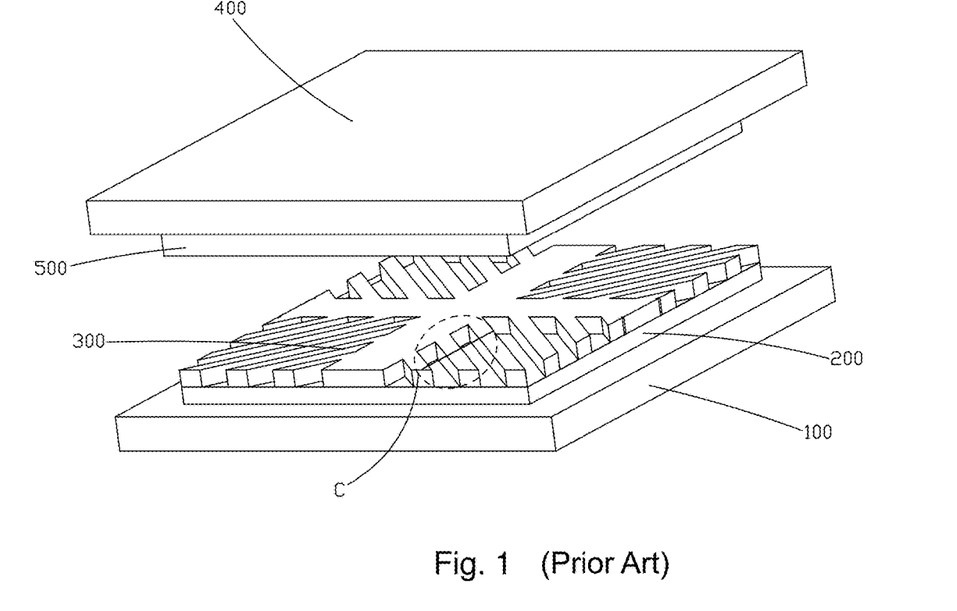
FIG. 1 is a stereo diagram of a liquid crystal display pixel structure according to prior art.
Figure 2:
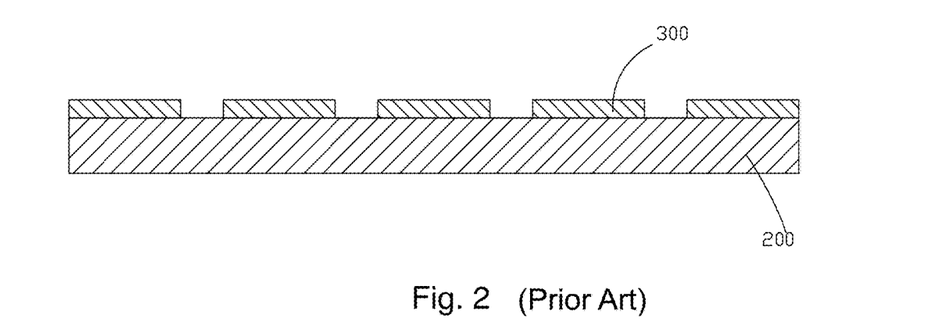
FIG. 2 is a sectional diagram corresponding to C section in FIG. 1.
Figure 3:
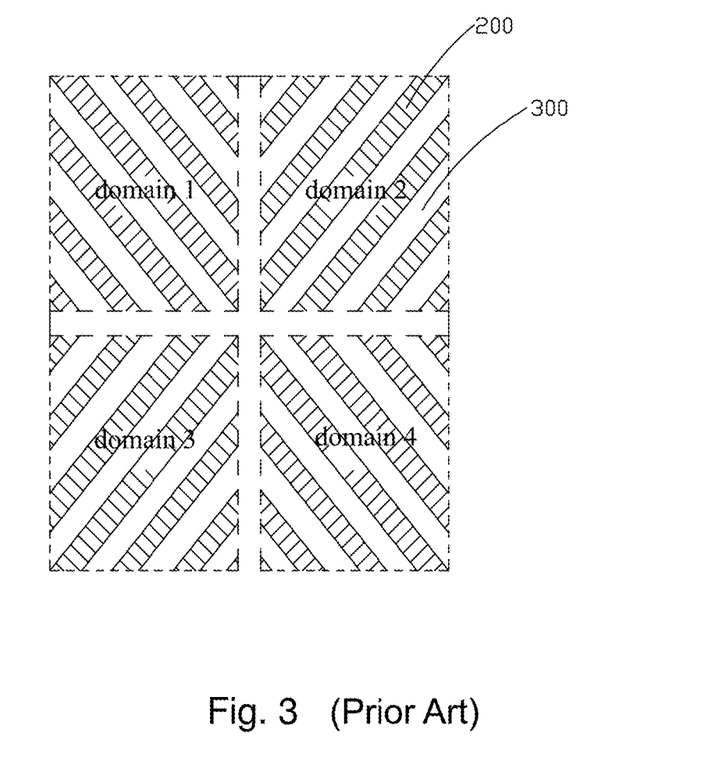
FIG. 3 is a plane diagram of the liquid crystal display pixel structure according to prior art.
Figure 4:
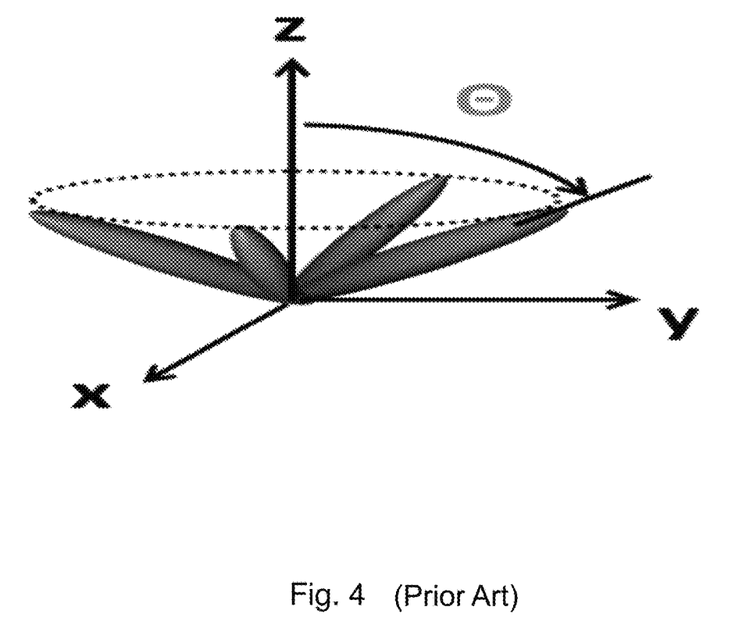
FIG. 4 is a diagram of a twisted liquid crystal of the liquid crystal display pixel structure according to prior art.
Figure 5:
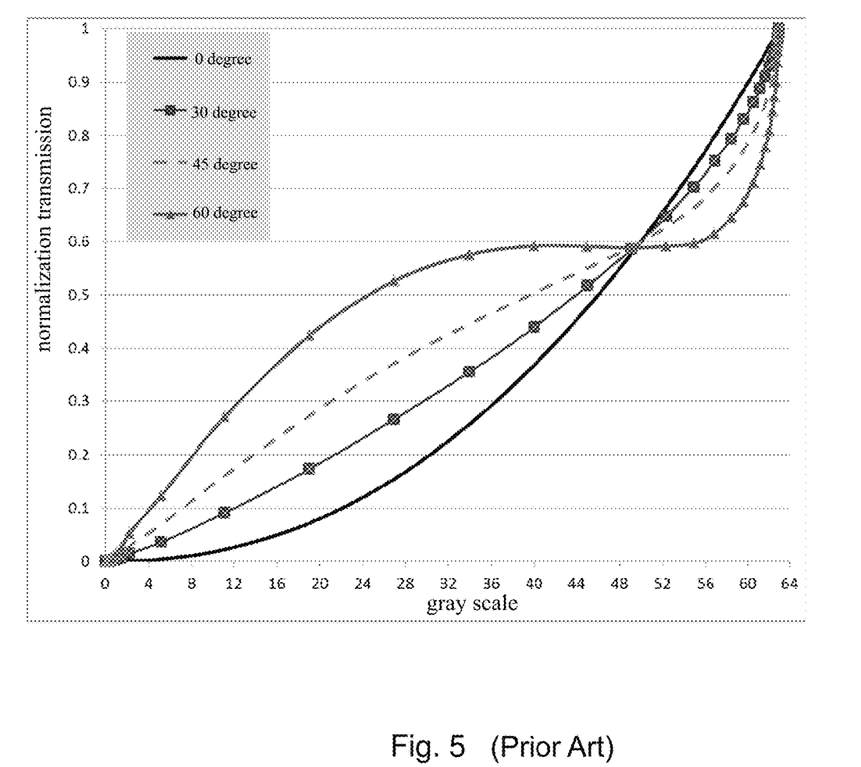
FIG. 5 is a diagram showing a color washout improvement measuring result of the liquid crystal display pixel structure according to prior art.

Please refer to FIG. 1, FIG. 2, FIG. 3, together which shows a liquid crystal display pixel structure according to prior art, comprising a lower substrate 100, a passivation layer 200 covering an upper surface of the lower substrate 100, a pixel electrode 300 formed on the passivation layer 200, an upper substrate 400 and a common electrode 500 covering a lower surface of the upper substrate 400. Each pixel comprises four domains. The pixel electrode 300 employs line/space structures with equal gaps in between similar as an optical grating, which requires a photo process for implementing patterning treatment; the passivation layer 200 is directly deposed on the lower substrate 100. Except the via holes, the other areas do not require the photo process for implementing patterning treatment; i.e. basically, the passivation layer 200 is flat. The pixel electrode 300 possesses line patterns. As shown in FIG. 4, FIG. 5, in the foregoing liquid crystal display pixel structure, the liquid crystals in one pixel only have one kind of rotation behavior under the same driving voltage. Therefore, the twisted angles Θ are the same. Although each pixel comprises four domains and provides a certain improvement to the color washout under wide view angle, the effect is not well. The color washout is still serious.

SUMMARY OF THE INVENTION

An objective of the present invention is to provide a liquid crystal display pixel structure capable of improving the color washout phenomenon under wide view angle, and simplifying the driving control circuit and raising the pixel aperture ratio.

Another objective of the present invention is to provide a manufacture method of a liquid crystal display pixel structure. The demands to photo apparatus and manufacture process are lower, and the color washout phenomenon of the liquid crystal display pixel structure obtained by the manufacture method under wide view angle can be significantly improved.

For realizing the aforesaid objectives, the present invention provides a liquid crystal display pixel structure, comprising: a lower substrate, a passivation layer located on an upper surface of the lower substrate, a pixel electrode located on the passivation layer, an upper substrate, and a common electrode located on a lower surface of the upper substrate; each pixel comprises multi domains; in one pixel, the passivation layer comprises at least two trench structures having different depths, and the pixel electrode uninterruptedly covers on the trench structures, the trench structures having different depths divide the one pixel into different areas to realize that liquid crystals in different areas of the one pixel have different twisted angles under the same driving voltage.

The trench structures comprise a concave part and a convex part adjacent to the concave part, and a depth of the concave part is smaller than or equal to a thickness of the passivation layer.

The depth of the concave part of the trench structures is not fixed, and an optimization adjustment is implemented thereto according to the thickness of the passivation layer and design demands;

a ratio of the different areas in the one pixel is not fixed which is variable and adjusted according to the design demands;

a width of the concave part and a width of the adjacent convex part are not fixed which are variable and adjusted according to the design demands.

The trench structures having different depths divide the one pixel into different areas along a diagonal direction of each domain.

The trench structures having different depths divide the one pixel into different areas along a horizontal direction and a vertical direction.

The trench structures having different depths divide the one pixel into different areas along a tilt direction.

The pixel electrode is an ITO electrode, and the common electrode is an ITO electrode.

The present invention further provides a manufacture method of a liquid crystal display pixel structure, comprising steps of:

step 1, providing a lower substrate and deposing a passivation layer on the lower substrate;

step 2, etching the passivation layer with a photo process;

in one pixel, the passivation layer is etched to form at least two trench structures having different depths;

the trench structures having different depths divide the one pixel into different areas;

step 3, deposing a pixel electrode on the passivation layer comprising the at least two trench structures having different depths to make the pixel electrode uninterruptedly cover on the trench structures;

step 4, providing an upper substrate, and deposing a common electrode on the upper substrate.

The trench structures comprise a concave part and a convex part adjacent to the concave part, and a depth of the concave part is smaller than or equal to a thickness of the passivation layer.

The depth of the concave part of the trench structures is not fixed, and an optimization adjustment is implemented thereto according to the thickness of the passivation layer and design demands;

a ratio of the different areas in the one pixel is not fixed which is variable and adjusted according to the design demands;

a width of the concave part and a width of the adjacent convex part are not fixed which are variable and adjusted according to the design demands.

The benefits of the present invention are: the present invention provides a liquid crystal display pixel structure, by locating at least two trench structures having different depths to the passivation layer in one pixel for dividing the one pixel into different areas, realizes that liquid crystals in different areas of the one pixel have different twisted angles under the same driving voltage, which can significantly improve the color washout phenomenon under wide view angle. Compared with the liquid crystal display pixel structure according to prior art, the number of the TFTs can be diminished to simplify the driving control circuit and raise the pixel aperture ratio; the present invention provides a manufacture method of the liquid crystal display pixel structure, by etching the passivation layer in one pixel to comprise at least two trench structures having different depths and directly deposing the pixel electrode on the trench structures, so that the high transmission ratio can be achieved without the high accuracy trench structures. The demands to photo apparatus and manufacture process are lower. The color washout phenomenon of the liquid crystal display pixel structure obtained by the manufacture method under wide view angle can be significantly improved.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 6:
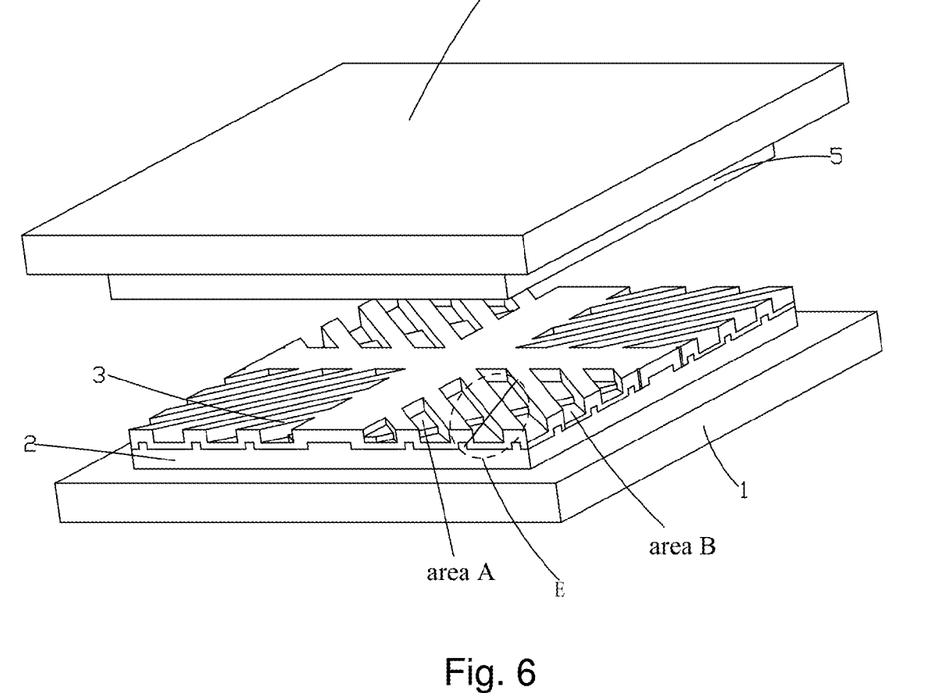
FIG. 6 is a stereo diagram of a liquid crystal display pixel structure according to the first embodiment of the present invention.
Figure 7:
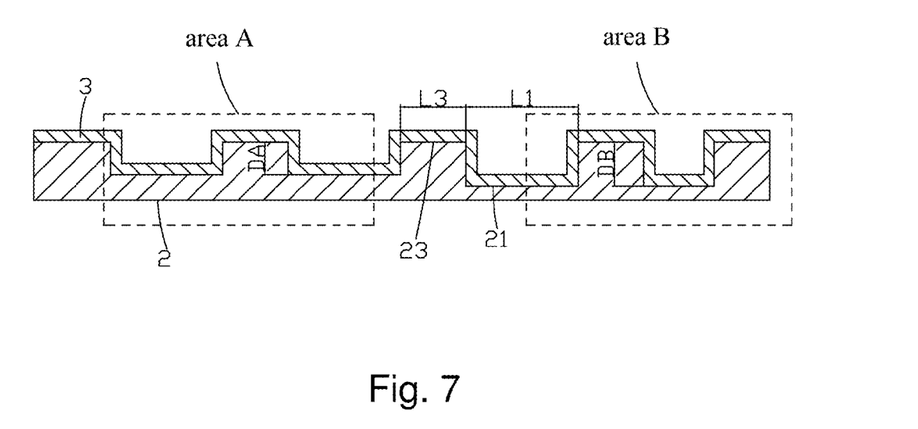
FIG. 7 is a sectional diagram corresponding to E section in FIG. 6.
Figure 8:
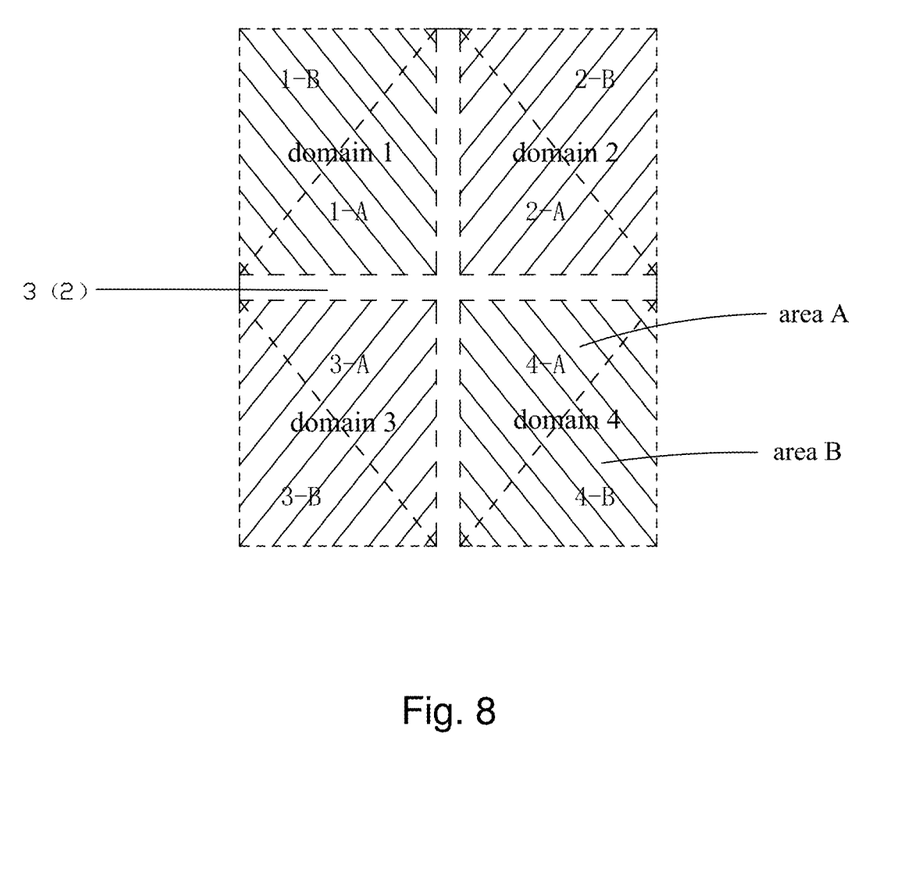
FIG. 8 is a plane diagram of the liquid crystal display pixel structure according to the first embodiment of the present invention.

Please refer to FIG. 6, FIG. 7, FIG. 8, which show a liquid crystal display pixel structure according to the first embodiment of the present invention at the same time. It comprises: a lower substrate 1, a passivation layer 2 located on an upper surface of the lower substrate 1, a pixel electrode 3 located on the passivation layer 2, an upper substrate 4 and a common electrode 5 located on a lower surface of the upper substrate 4.

The pixel electrode 3 is an ITO electrode, and the common electrode 5 is an ITO electrode. Each pixel comprises multi domains; in one pixel, the passivation layer 2 comprises at least two trench structures having different depths, and the pixel electrode 3 uninterruptedly covers on the trench structures, the trench structures having different depths divide the one pixel into different areas. In the first embodiment, each pixel comprises four domains, which respectively are a domain 1, a domain 2, a domain 3, a domain 4; in one pixel, the passivation layer 2 comprises at least two trench structures having different depths, which respectively are an area A, an area B. A trench depth DA in the area A is smaller than a trench depth DB in the area B. The passivation layer 2 requires a photo process to implement patterning treatment to have the trench structures having different depths. The pixel electrode 3 uninterruptedly covers on the trench structures without the photo process but directly deposition on the trench structures of the passivation layer 2.

Specifically, as shown in FIG. 7, the trench structures comprise a concave part 21 and a convex part 23 adjacent to the concave part 21, and a depth of the concave part 21 is smaller than or equal to a thickness of the passivation layer 2. The depth of the concave part 21 of the trench structures is not fixed, and an optimization adjustment is implemented thereto according to the thickness of the passivation layer 2 and design demands. A width L1 of the concave part 21 and a width L3 of the adjacent convex part 23 are not fixed which are variable and adjusted according to the design demands. The liquid crystal display pixel structure of the present invention does not require high accuracy trench structures.

Figure 9:
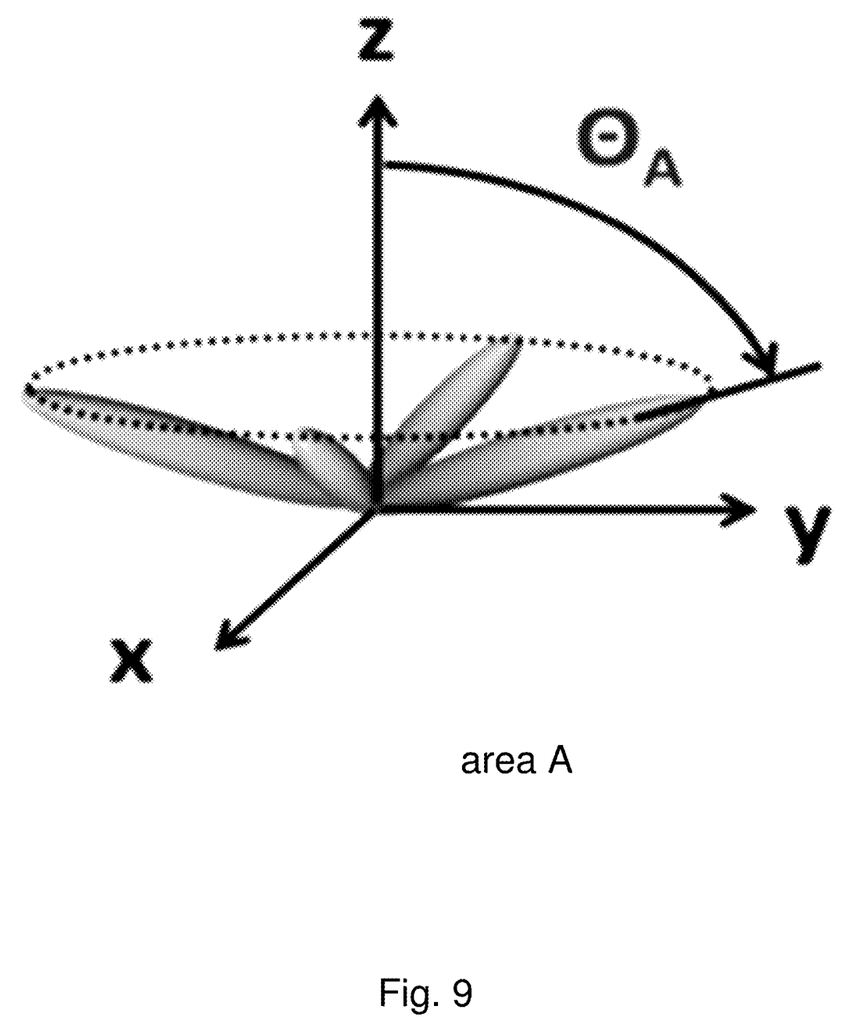
FIG. 9 is a diagram of a twisted liquid crystal in the area A of the liquid crystal display pixel structure according to the first embodiment of the present invention.
Figure 10:
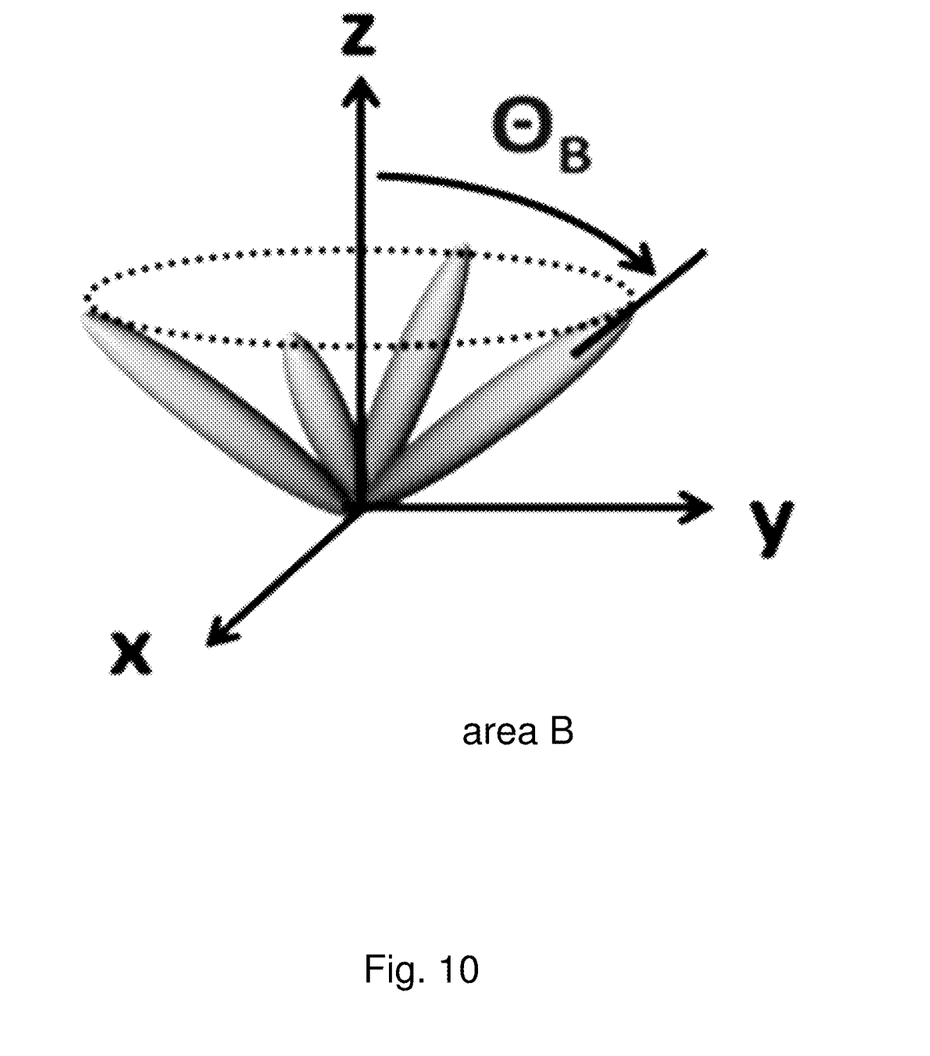
FIG. 10 is a diagram of a twisted liquid crystal in the area B of the liquid crystal display pixel structure according to the first embodiment of the present invention.
Figure 11:
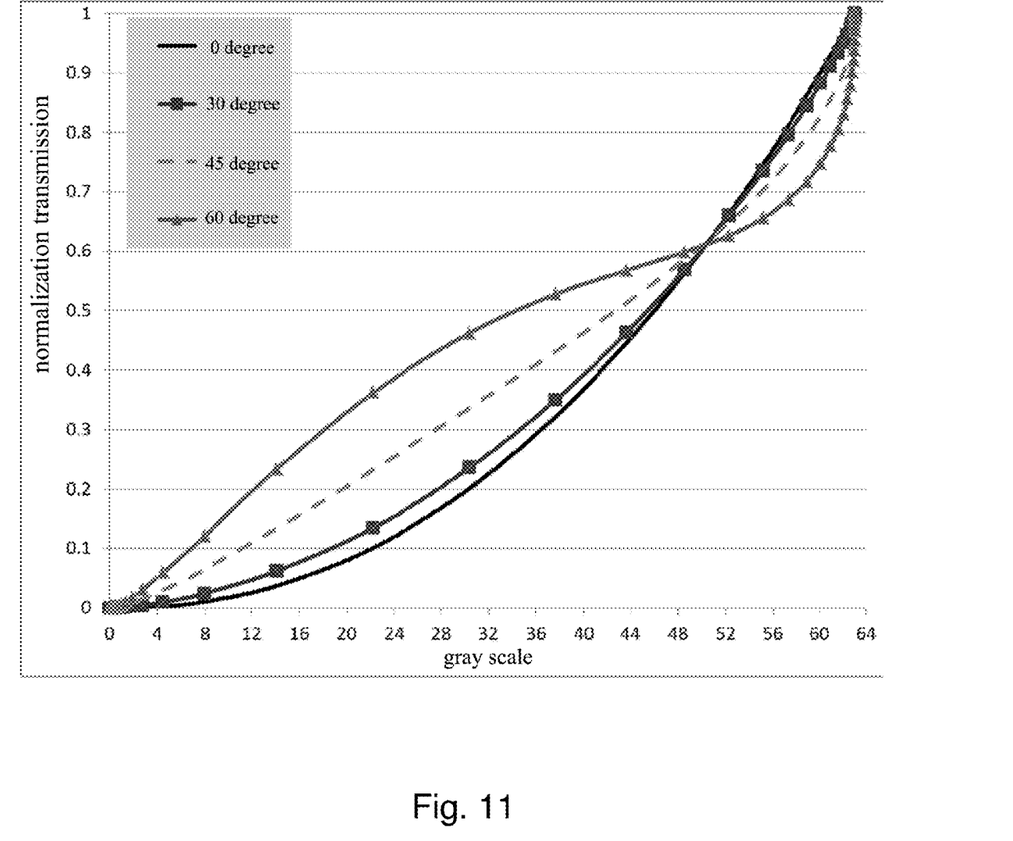
FIG. 11 is a diagram showing a color washout improvement measuring result of the liquid crystal display pixel structure according to the first embodiment of the present invention.

As shown in FIG. 8, the two trench structures having different depths divide the one pixel into an area A and an area B along a diagonal direction of each domain. The domain 1 is divided into 1-A and 1-B along the diagonal direction of domain 1, and the domain 2 is divided into 2-A and 2-B along the diagonal direction of domain 2, and the domain 3 is divided into 3-A and 3-B along the diagonal direction of domain 3, and the domain 4 is divided into 4-A and 4-B along the diagonal direction of domain 4, which is equivalent to eight domains located in the one pixel. As shown in FIG. 9, FIG. 10, under the same driving voltage, the liquid crystal twisted angle ΘA in the area A and the liquid crystal twisted angle ΘB in the area B are different. The obtained beneficial effect is shown in FIG. 11, and the color washout phenomenon under wide view angle can be significantly improved. Therefore, the liquid crystal display pixel structure of the present invention can realize that the liquid crystals in the different areas of the one pixel have different twisted angles under the same driving voltage. Compared with the liquid crystal display pixel structure according to prior art, the color washout phenomenon under wide view angle can be significantly improved, and the number of the TFTs can be diminished to simplify the driving control circuit and raise the pixel aperture ratio.

Specifically, in the first embodiment, merely the condition that the ratio of the area A and the area B is 1:1 is shown. However, the ratio of the area A and the area B is not restricted to be 1:1 but 1:2, 1:3, 2:3, 3:5, et cetera. That is to say, the ratio of the different areas in the one pixel is not fixed which can be variable and adjusted according to the design demands.

Figure 12:
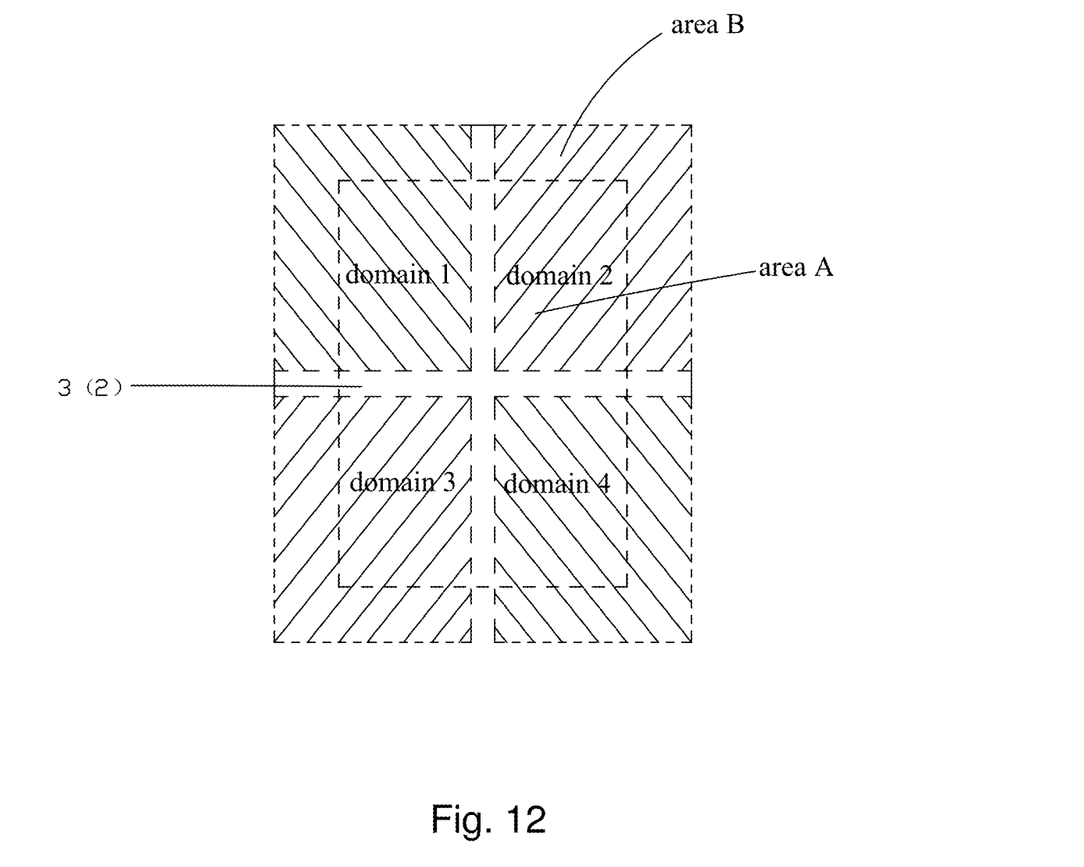
FIG. 12 is a plane diagram of the liquid crystal display pixel structure according to the second embodiment of the present invention.

FIG. 12 is a plane diagram of the liquid crystal display pixel structure according to the second embodiment of the present invention. The difference between the second embodiment and the first embodiment is, the two trench structures having different depths divide the one pixel into an area A and an area B along a horizontal direction and a vertical direction. The liberal interpretation can be that the trench structures having different depths divide the one pixel into different areas along a horizontal direction and a vertical direction. Others are the same as the first embodiment. The repeated description is omitted here.

Figure 13:
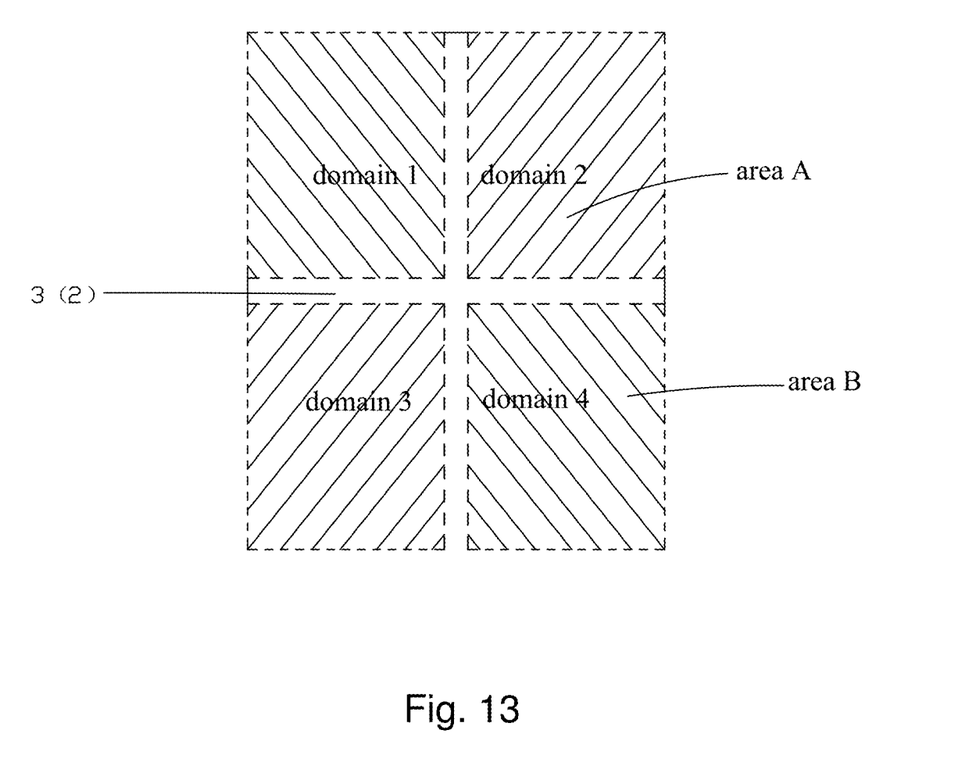
FIG. 13 is a plane diagram of the liquid crystal display pixel structure according to the third embodiment of the present invention.

FIG. 13 is a plane diagram of the liquid crystal display pixel structure according to the third embodiment of the present invention. The difference between the third embodiment and the first embodiment is, the two trench structures having different depths divide the one pixel into an area A and an area B along a tilt direction. The liberal interpretation can be that the trench structures having different depths divide the one pixel into different areas along a tilt direction. Others are the same as the first embodiment. The repeated description is omitted here.

Figure 14:
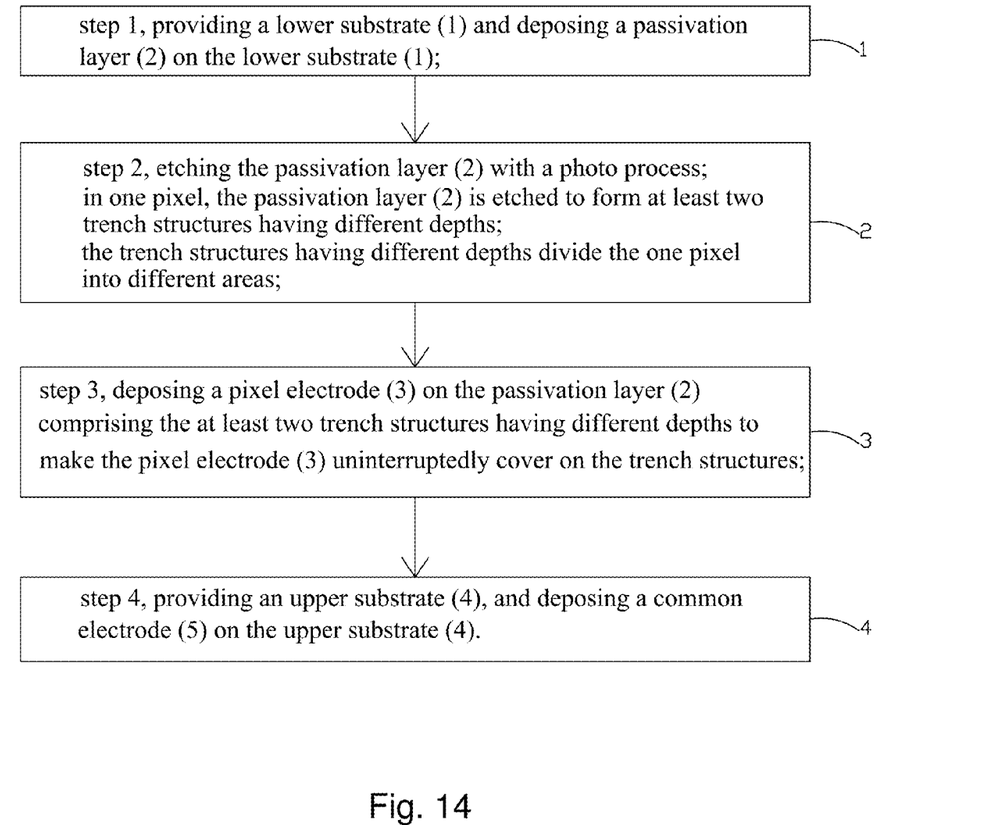
FIG. 14 is a flowchart of a manufacture method of the liquid crystal display pixel structure according to the present invention.

Please refer to FIG. 14 with FIG. 6 to FIG. 8 at the same time. The present invention further provides a manufacture method of the liquid crystal display pixel structure, comprising steps of:

step 1, providing a lower substrate 1 and deposing a passivation layer 2 on the lower substrate 1.

step 2, etching the passivation layer 2 with a photo process.

In one pixel, the passivation layer 2 is etched to form at least two trench structures having different depths.

The trench structures having different depths divide the one pixel into different areas.

step 3, deposing a pixel electrode 3 on the passivation layer 2 comprising the at least two trench structures having different depths to make the pixel electrode 3 uninterruptedly cover on the trench structures.

In the step 3, the pixel electrode 3 is directly deposed on the two trench structures to achieve the high transmission ratio without the high accuracy trench structures.

step 4, providing an upper substrate 4, and deposing a common electrode 5 on the upper substrate 4.

Specifically, the trench structures comprise a concave part 21 and a convex part 23 adjacent to the concave part 21, and a depth of the concave part 21 is smaller than or equal to a thickness of the passivation layer 2.

The depth of the concave part 21 of the trench structures is not fixed, and an optimization adjustment is implemented thereto according to the thickness of the passivation layer 2 and design demands. A ratio of the different areas in the one pixel is not fixed which is variable and adjusted according to the design demands. A width L1 of the concave part 21 and a width L3 of the adjacent convex part 23 are not fixed which are variable and adjusted according to the design demands. The liquid crystal display pixel structure of the present invention does not require high accuracy trench structures. The demands of the method to photo apparatus and manufacture process are lower. The color washout phenomenon of the liquid crystal display pixel structure obtained by the manufacture method under wide view angle can be significantly improved.

In conclusion, the liquid crystal display pixel structure of the present invention, by locating at least two trench structures having different depths to the passivation layer in one pixel for dividing the one pixel into different areas, realizes that liquid crystals in different areas of the one pixel have different twisted angles under the same driving voltage, which can significantly improve the color washout phenomenon under wide view angle. Compared with the liquid crystal display pixel structure according to prior art, the number of the TFTs can be diminished to simplify the driving control circuit and raise the pixel aperture ratio; the present invention provides a manufacture method of the liquid crystal display pixel structure, by etching the passivation layer in one pixel to comprise at least two trench structures having different depths and directly deposing the pixel electrode on the trench structures, so that the high transmission ratio can be achieved without the high accuracy trench structures. The demands to the photo apparatus and the manufacture process are lower. The color washout phenomenon of the liquid crystal display pixel structure obtained by the manufacture method under wide view angle can be significantly improved.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display pixel structure, comprising: a lower substrate, a passivation layer located on an upper surface of the lower substrate, a pixel electrode located on the passivation layer, an upper substrate, and a common electrode located on a lower surface of the upper substrate; each pixel comprises multi domains; in one pixel, the passivation layer comprises at least two trench structures having different depths, and the pixel electrode uninterruptedly covers on the trench structures, the trench structures having different depths divide the one pixel into different areas to realize that liquid crystals in different areas of the one pixel have different twisted angles under the same driving voltage.

2. The liquid crystal display pixel structure according to claim 1, wherein the trench structures comprise a concave part and a convex part adjacent to the concave part, and a depth of the concave part is smaller than or equal to a thickness of the passivation layer.

3. The liquid crystal display pixel structure according to claim 2, wherein the trench structures having different depths divide the one pixel into different areas along a diagonal direction of each domain.

4. The liquid crystal display pixel structure according to claim 2, wherein the trench structures having different depths divide the one pixel into different areas along a horizontal direction and a vertical direction.

5. The liquid crystal display pixel structure according to claim 2, wherein the trench structures having different depths divide the one pixel into different areas along a tilt direction.

6. The liquid crystal display pixel structure according to claim 1, wherein the pixel electrode is an ITO electrode, and the common electrode is an ITO electrode.

7. A manufacture method of a liquid crystal display pixel structure, comprising steps of:
 step 1, providing a lower substrate and deposing a passivation layer on the lower substrate;
 step 2, etching the passivation layer with a photo process; in one pixel, the passivation layer is etched to form at least two trench structures having different depths;
 the trench structures having different depths divide the one pixel into different areas;
 step 3, deposing a pixel electrode on the passivation layer comprising the at least two trench structures having different depths to make the pixel electrode uninterruptedly cover on the trench structures;
 step 4, providing an upper substrate, and deposing a common electrode on the upper substrate.

8. The manufacture method of the liquid crystal display pixel structure according to claim 7, wherein the trench structures comprise a concave part and a convex part adjacent to the concave part, and a depth of the concave part is smaller than or equal to a thickness of the passivation layer.

9. A liquid crystal display pixel structure, comprising: a lower substrate, a passivation layer located on an upper surface of the lower substrate, a pixel electrode located on the passivation layer, an upper substrate, and a common electrode located on a lower surface of the upper substrate; each pixel comprises multi domains; in one pixel, the passivation layer comprises at least two trench structures having different depths, and the pixel electrode uninterruptedly covers on the trench structures, the trench structures having different depths divide the one pixel into different areas to realize that liquid crystals in different areas of the one pixel have different twisted angles under the same driving voltage;
 wherein the trench structures comprise a concave part and a convex part adjacent to the concave part, and a depth of the concave part is smaller than or equal to a thickness of the passivation layer;
 wherein the pixel electrode is an ITO electrode, and the common electrode is an ITO electrode.

10. The liquid crystal display pixel structure according to claim 9, wherein the trench structures having different depths divide the one pixel into different areas along a diagonal direction of each domain.

11. The liquid crystal display pixel structure according to claim 9, wherein the trench structures having different depths divide the one pixel into different areas along a horizontal direction and a vertical direction.

12. The liquid crystal display pixel structure according to claim 9, wherein the trench structures having different depths divide the one pixel into different areas along a tilt direction.

* * * * *